March 26, 1963
A. O. RUSSELL
3,083,029
GOLF CART
Filed Sept. 28, 1960
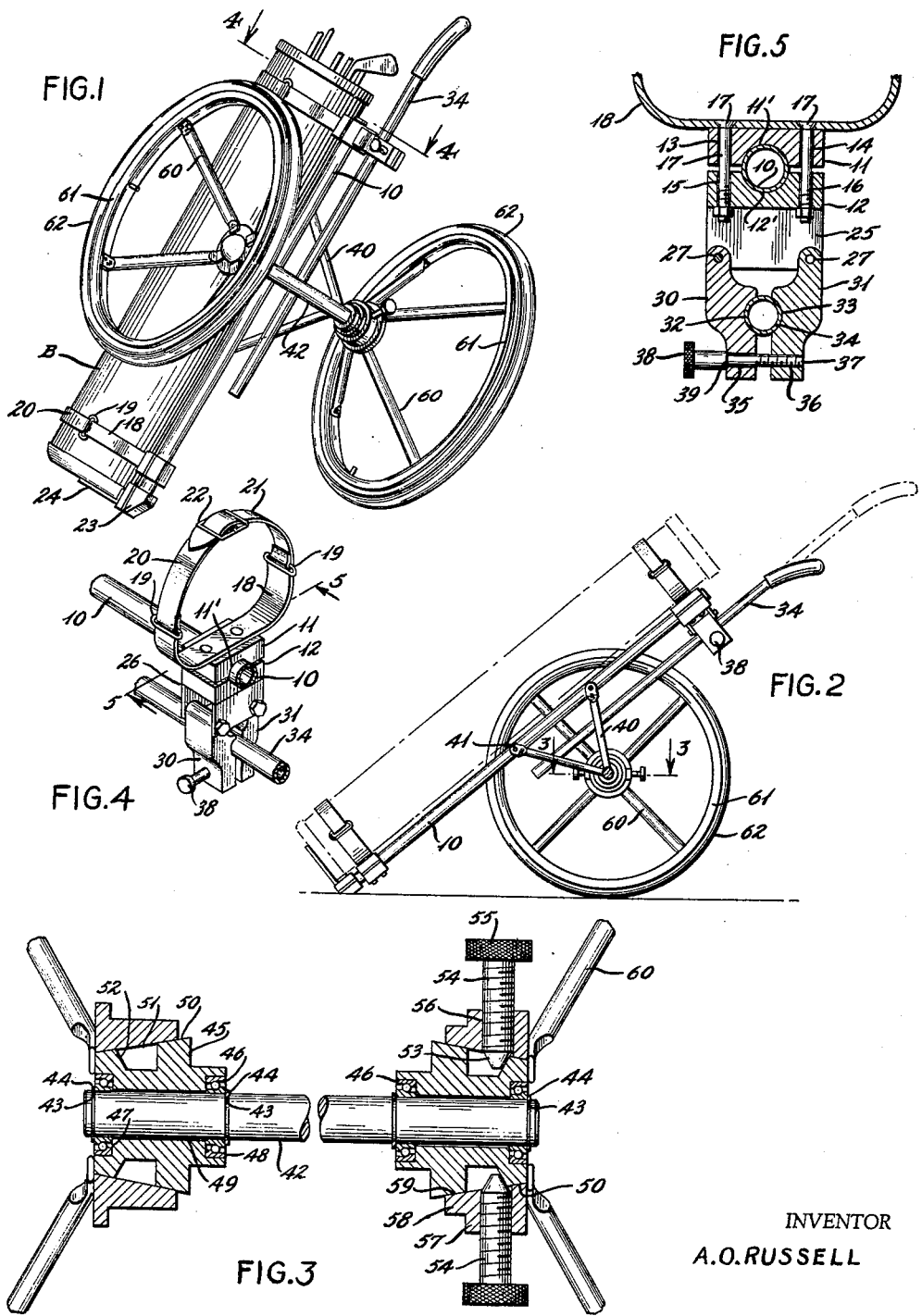
INVENTOR
A.O. RUSSELL
BY
ATTORNEY United States Patent Office 3,083,029
Patented Mar. 26, 1963

3,083,029
GOLF CART
Arthur O. Russell, Box 175A, Rte. 1, Sanford, Fla.
Filed Sept. 28, 1960, Ser. No. 59,033
3 Claims. (Cl. 280—36)

This invention relates to sports and to equipment employed in such sports including in the game of golf wherein a number of golf clubs and golf balls are carried in a bag which when filled with golf clubs and balls is relatively heavy particularly when carried by a golfer or a caddy.

The invention relates particularly to golf carts by which golf bags are supported and pulled by players over a golf course when playing golf and which carts are constructed in a manner to be taken apart, folded or collapsed into a more compact unit when not in use.

Golf carts heretofore in use have had small wheels up to 12" in diameter for convenience in folding and storage and have been composed of numerous movable parts joined with pins and other small parts which wear quickly, become loose, operate poorly and such carts require extra force for the propulsion of the cart especially when in the rough area of the course.

It is an object of the invention to provide a simple and inexpensive golf cart having a relatively small rigid frame and axle of fixed size and relatively large outwardly dished removable and replaceable wheels which is more difficult to upset, easier to push or pull, is more durable, and with the wheels removed occupies small space.

Another object of the invention is to provide a golf cart of fewer parts, of maximum rigidity and durability, with a permanently fixed axle of a length no greater than the transverse dimension of the golf bag and with removable and replaceable wheels of relatively large diameter and dished wheels which provide for substantially greater spacing of the ground engaging portions.

Other objects and advantages of the invention will be apparent from the following description taken in conjunction with the accompanying drawing wherein:

FIG. 1 is a bottom perspective illustrating one application of the invention;

FIG. 2, a side elevation of the device of FIG. 1 with one wheel removed;

FIG. 3, an enlarged fragmentary detail of the axle and wheel mounting on the horizontal line 3—3 of FIG. 2;

FIG. 4, an enlarged perspective on the line 4—4 of FIG. 1; and

FIG. 5, further enlarged fragmentary vertical section on the line 5—5 of FIG. 4.

Briefly stated, the invention is a golf cart including a relatively slim elongated supporting member with brackets engageable with opposite end portions of a golf bag and with a handle telescopically held between the upper of the two brackets. The frame member is mounted on an axle by a pair of V braces at each side of the frame member with the diverging legs of the braces attached to the frame member and with said braces extending laterally from such main frame member and with the apex or point of the V fixed to an axle of a length substantially equal to the transverse dimension of the golf bag to be supported, and with the opposite ends of the axle supported in hubs of outwardly dished wheels, the hubs being of two complementary parts including an inner hub segment mounted between fixed abutments on bearings, and an outer hub segment complementary to the first and a part of the wheel, the first hub segment having a frusto-conical exterior with an annular groove one side of which is beveled, and the other hub segment having a complementary frusto-conical inner wall surface for receiving the exterior of the first and with a couple of manually operable screws with tapered ends corresponding to the taper of the inner hub segment or approximately at an angle of 60° so that when the parts are assembled and the screws are tightened there will be a tendency to produce relative axial movement between the two hub segments binding them tightly together, the brackets extending outwardly from the frame member providing an increased width of support and the additional support provided by the relatively large outwardly dished wheels resulting in maximum stability for the cart.

With continued reference to the drawing, the golf cart of the present invention comprises a relatively slim elongated frame member 10 preferably of lightweight tubular construction. On the opposite end portions of the frame member 10 are located cooperating clamping blocks 11 and 12, also preferably of lightweight construction, and having substantially semi-circular socket forming openings 11' and 12' respectively. The block 11 has openings 13 and 14 through opposite end portions of the same and the block 12 has similarly spaced openings 15 and 16 with clamping bolts and nuts 17 through each pair of openings 13, 15 and 14, 16 for clamping the blocks about the frame member 10.

The heads of the bolts and nuts 17 extend through and bind a generally U-shaped metal clamp forming strap 18 to the block 11. Each end of the strap 18 terminates in an oval or eye 19 to which are connected flexible straps 20, 21, connected by a buckle 22 permitting the ends of a golf bag B to be inserted and secured by tightening the straps 20, 21 around such bag and fastening them in such tightened position by means of the buckle 22.

The lower end of the frame member 10 is provided with a foot or skid block 23 having a lateral or outwardly extending supporting plate 24 against which the bottom of the bag B rests, the foot or skid block being adapted to come into contact with the ground when the bag is in generally upright position and the cart is unattended.

In order to provide a handle for the device a pair of plates 25 are secured by welds 26, or other means, to the remote side of the block 12 from the frame member 10 and these plates are provided with spaced bolts and nuts 27 which serve as pivots for a pair of clamping jaws 30 and 31 having substantially semi-circular sockets 32 and 33 adapted to fit about a handle member 34. The jaw 30 has an unthreaded transverse opening 35 through its end remote from its pivot end, and the jaw 31 has an internally threaded opening 36 aligned with the opening 35, which opening 36 is for reception of an externally threaded clamping screw 37 having a knurled manipulating head 38 and a shoulder 39 adapted to engage the remote surface of the clamping jaw 30, thereby binding the two jaws together and clamping them around the handle 34, but permitting the longitudinal adjustment of the handle relative to the supported golf bag.

Means is provided for mounting the elongated frame member 10 which supports the golf bag and the handle 34, such means including a pair of angular arms or brackets 40 secured in spaced relation to the frame member 10 at a position along the length of the same so that the frame member and supported structure will be in a properly balanced position. In view of such construction when the golf cart is in use it will be necessary to apply very little force to the handle other than that sufficient to push or pull the golf cart along the surface of the earth.

The opposite ends of the arms or brackets 40 are convergingly attached to the axle 42 and such opposite ends are spaced apart as far as possible approaching the thickness of the golf bag to be supported or the spacing of the U-shaped extremities of the metal holder 18.

The axle 42 is provided at its ends with spaced annular grooves 43 in which are received snap rings 44 for retaining an inner hub segment 45 thereon between anti-friction bearings 46. The hub segments are provided with annular grooves 47 and 48 at opposite ends of a central opening 49 in the hub segment 45, in which opening 49 the axle 42 is adapted to be received.

The hub segment 45 is provided with an outer circumferential frusto-conical mounting surface 50 with an annular groove 51 having an inclined wall 52 against which the 60° pointed extremity 53 of an externally threaded attaching screw 54 is adapted to bear, such screw having a knurled manipulating head 55. The screw 54 is carried in an internally threaded opening 56 in a boss 57 of an outer hub segment 58 having an inner frusto-conical surface 59 complementary to the surface 50 of the inner hub segment 45. By the use of diametrically opposed screws 54 the hub segments may be fastened tightly together or the outer hub segment may be removed from the inner hub segment by manipulating the knurled heads 55 of the externally threaded screws 54. Tightening of the screws 54 produces relative axial movement of the hub segments 45 and 58 due to the fact that the outer angle of the groove is 60° or complementary to the angle of the pointed end of the screw.

To the hub segment 58 are welded or otherwise attached a series of spokes 60 which mount a rim 61 and tire 62. The rim and tire are axially offset from the cooperating hub segments and the spokes 60 extend angularly from the outer hub segment to such rim to provide in effect an outwardly dished wheel for a wider more stabilized supporting action and for wider contact with the surface on which the cart is supported. Also the wheels are relatively large, 20" in diameter having been found satisfactory, the larger wheels being employed in order that they may be utilized to carry a heavier load with less effort.

The manner in which the hub segments are constructed to be joined or separated permits the wheels to be removed from the cart and the remaining frame member with the golf bag thereon is of relatively small girth requiring minimum space. With the wheels removed and the handle overlying the frame section 10 the structure occupies very little space beyond the sides of the golf bag itself.

It will be apparent from the foregoing that a golf cart is provided composed primarily of a single backbone or frame member with an axle rigidly fixed thereto but of a length substantially equal to the thickness of a golf bag and instead of a flimsy collapsible structure with multiple small working parts which readily wear and result in a wobbly operation, there is provided a rigid solid structure in which the length of the axle makes for compactness and the use of larger dished wheels affords increased stability, less likelihood of overturning, requires less force to pull or push. This permits the ready transportation of two or more carts in the trunk of an automobile with only the removal of the wheels. Also the golf cart of the present invention is of maximum durability since it eliminates pins and small parts which quickly wear and become loose and operate poorly.

Further the cart can be tipped sideways 20 degrees without turning over while conventional carts can be tipped over at substantially 12 degrees and frequently blow over. The present cart cannot possibly turn over when parked at an angle, and the present wheels can be instantly mounted or demounted with the golf cart standing vertically and while leaning against an automobile, the present cart being constructed to use conventional bicycle tires and rims, is easily propelled, rigid, simple, practical and satisfactory to use.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A golf cart comprising elongated relatively slim frame structure of a size to support a golf bag, a handle longitudinally adjustably attached to said frame structure, supporting means for said frame structure comprising axle means of a length substantially corresponding to the transverse dimension of said golf bag, brackets having spaced legs attached to each side of said frame structure and extending outwardly from said frame structure and with said legs extending toward each other onto and affixed to said axle, outwardly dished relatively large wheels mounting said axle, said wheels having rims spaced a substantially greater distance apart than the length of said axle, and hubs removably mounting said wheels on said axle, each hub comprising an inner hub segment mounted on bearings on said axle and with an axially tapered outer surface, and an outer hub segment having an internal surface of a taper complementary to that of the external surface of the inner hub segment, one of said hub segments having a beveled portion and the other a movable complementary beveled portion engageable for exerting axial pressure between said hub segments for pressing them axially together in relatively tight relation.

2. In a golf cart having an elongated frame, an axle means connected to said frame and a pair of wheels, an inner hub segment rotatably mounted on each end of said axle means and having a frusto-conical outer surface, an outer hub segment carried by said wheels and having an inner frusto-conical surface complementary to the outer surface of said inner hub segment, one of said hub segments having an annular groove with a beveled portion and the other hub segment having a movable beveled portion for complementary engagement with the beveled portion of the first hub segment for causing an axial movement of one of said frusto-conical surfaces relative to the other whereby said hub segments will be locked together.

3. In a golf cart having an elongated frame, an axle inner hub segment rotatably mounted on each end of said axle means and having a tapered outer surface, an outer hub segment carried by said wheels and having a tapered surface complementary to the outer surface of said inner hub segment, one of said hub segments having a beveled portion and the other hub segment having a movable beveled portion for complementary engagement with the beveled portion of the first hub segment for causing an axial movement of one of said inner and outer surfaces relative to the other whereby said hub segments will be locked together.

References Cited in the file of this patent

UNITED STATES PATENTS

| 751,635 | Gustafson | Feb. 9, 1904 |
| 1,349,997 | Allen | Aug. 17, 1920 |
| 1,606,077 | Johnson | Nov. 9, 1926 |
| 2,236,053 | Caron | Mar. 25, 1941 |

FOREIGN PATENTS

| 327,792 | Great Britain | Apr. 17, 1930 |